United States Patent

Matsuhiro et al.

[11] Patent Number: 6,018,996
[45] Date of Patent: Feb. 1, 2000

[54] VIBRATION TYPE ANGULAR VELOCITY DETECTOR

[75] Inventors: Yasushi Matsuhiro, Nukata-gun; Takeshi Ito, Okazaki; Takayuki Ishikawa; Yoshimi Yoshino, both of Anjo, all of Japan

[73] Assignees: Denso Corporation, Kariya; Nippon Soken, Nishio, both of Japan

[21] Appl. No.: 09/090,994

[22] Filed: Jun. 5, 1998

[30] Foreign Application Priority Data

Jun. 6, 1997 [JP] Japan .................................. 9-149415

[51] Int. Cl.$^7$ ...................................... G01P 9/00
[52] U.S. Cl. ........................................ 73/504.12
[58] Field of Search ........................... 73/504.12, 504.14, 73/504.15, 504.16, 504.02, 504.03, 504.04

[56] References Cited

U.S. PATENT DOCUMENTS 5,806,364  9/1998  Kato et al. ............................ 73/504.12
5,850,035  12/1998  Layton et al. ....................... 73/504.16

FOREIGN PATENT DOCUMENTS

| 62-52410 | 3/1987 | Japan . |
|---|---|---|
| 63-286707 | 11/1988 | Japan . |
| 3-120415 | 5/1991 | Japan . |
| 8-5382 | 1/1996 | Japan . |
| 8-178670 | 7/1996 | Japan . |

*Primary Examiner*—Richard A. Moller
*Attorney, Agent, or Firm*—Pillsbury Madison & Sutro LLP

[57] ABSTRACT

The output of a synchronous detector is made precise by reducing the offset included in the outputs of detecting piezoelectric elements. This is carried out by applying one y-axis direction exciting force to one movable piece from one pair of driving piezoelectric elements and another y-axis direction exciting force to another movable piece from another pair of driving piezoelectric elements.

16 Claims, 7 Drawing Sheets

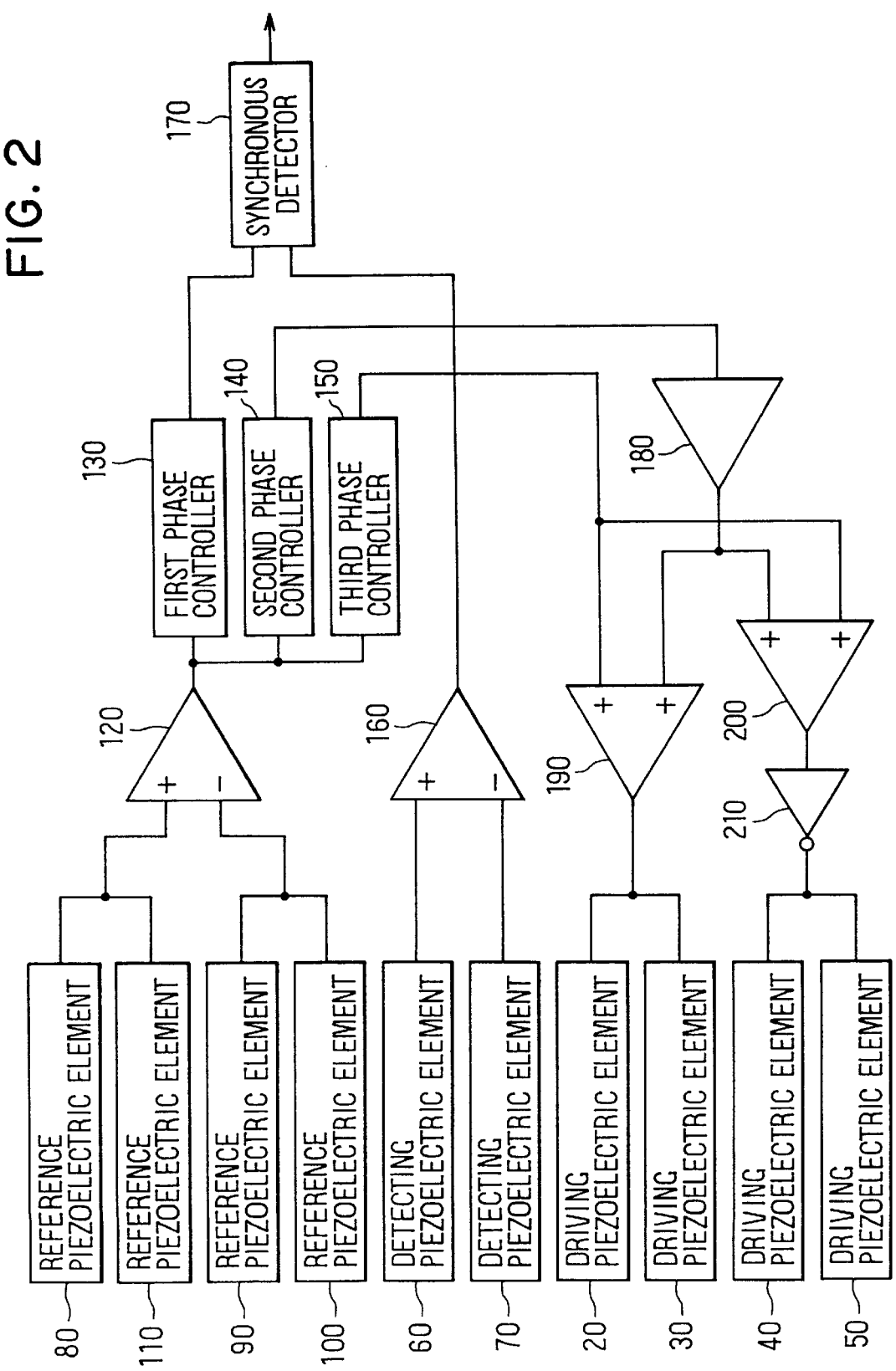

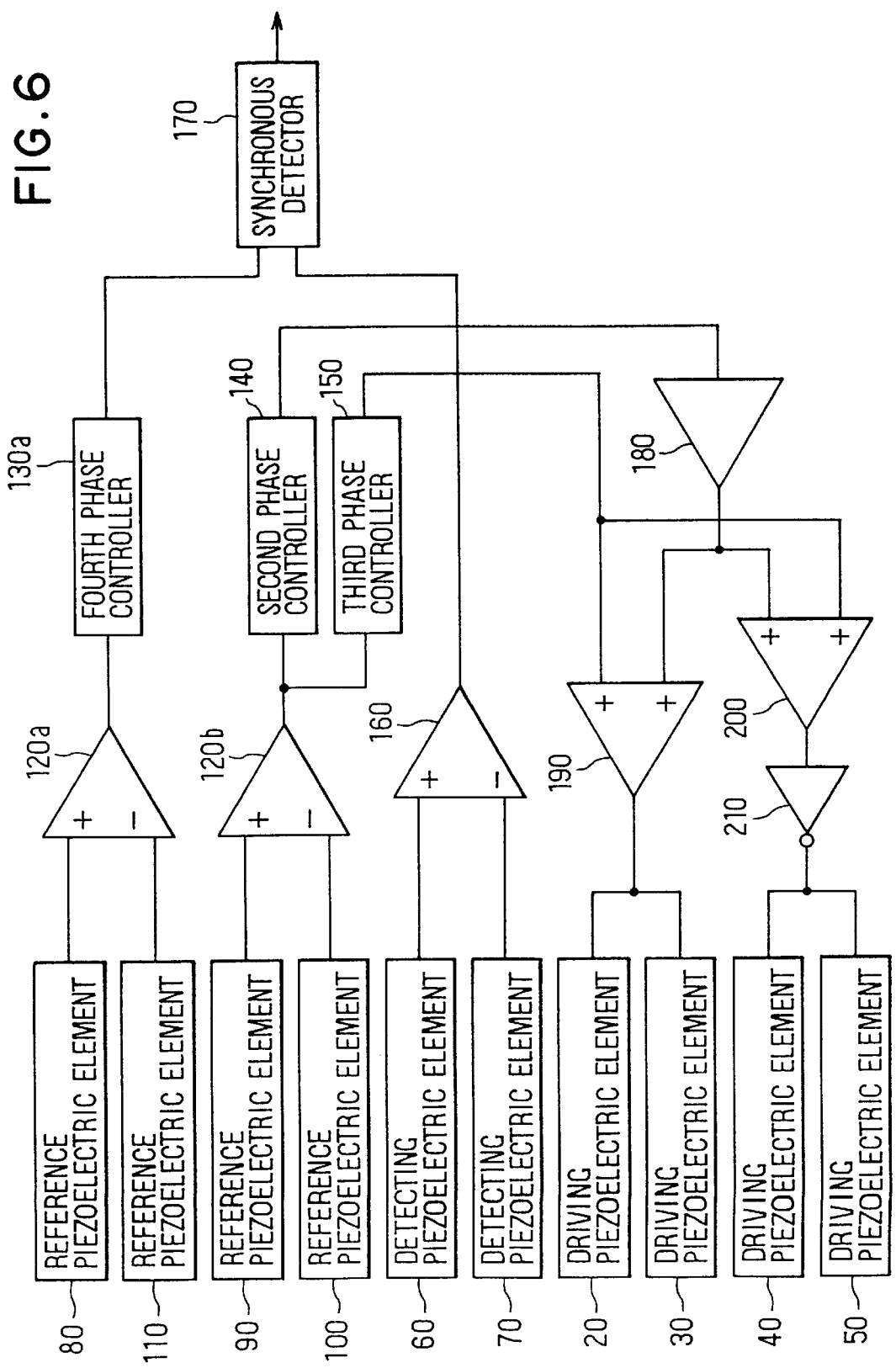

VIBRATION TYPE ANGULAR VELOCITY DETECTOR

CROSS REFERENCE TO RELATED APPLICATION

This application is based upon and claims priority from Japanese Patent Application No. Hei 9-149415 filed on Jun. 6, 1997, the contents of which are incorporated herein by reference.

BACKGROUND OF THE INVENTION

1. Field of the Invention

The present invention relates to a vibration type angular velocity detector used for vehicles, for example.

2. Related Art

A conventional vibration type angular velocity detector used for vehicles has driving piezoelectric elements, detecting piezoelectric elements and reference piezoelectric elements, which are affixed on vibration pieces. In this vibration type angular velocity detector, the vibration pieces vibrate in the x-axis direction as driven by the driving piezoelectric elements (driving vibration). When the angular velocity of the vehicle changes, the detecting piezoelectric elements detect vibrations resulting from a coriolis force acting on the vibration pieces in the y-axis direction (detecting vibration). The reference piezoelectric elements detect vibration of the vibration pieces in the x-axis direction. The angular velocity detector adjusts phases of outputs from the reference piezoelectric elements (reference vibration) to be in phase with the phase of the y-axis direction vibration. Finally, the angular velocity detector synchronously detects the outputs of the detecting piezoelectric elements as the angular velocity based on the outputs of the reference piezoelectric elements.

The driving vibration described above and the detecting vibration both act on the same vibration pieces. However, the direction of the driving vibration is perpendicular to that of the detecting vibration. When the coriolis force is F, the mass of the vibration pieces is m, the vibration speed of the vibration pieces is V and the angular velocity of the vibration pieces is $\Omega$, the coriolis force F is calculated as follows.

$$F = 2m(V \times \Omega) \quad (1)$$

In Equation (1), the coriolis force F, the vibration speed V and the angular velocity $\Omega$ are vector quantities, and the symbol x represents a vector product (outer product). It is necessary to selectively detect the vibration based on the coriolis force F according to Equation (1) so that the angular velocity $\Omega$ can be determined. That is, only the detecting vibration should be detected. However, it is difficult to detect the detecting vibration precisely because of manufacturing processes for the vibration pieces. For instance, it is difficult to affix the driving piezoelectric elements and detecting piezoelectric elements on the vibration pieces so that the vibration direction of the driving piezoelectric elements (driving vibration) and the vibration direction of the detecting piezoelectric elements (detecting vibration) are perpendicular to each other. As a result, the detecting vibration includes a bit of the driving vibration.

In order to solve this problem, another conventional vibration type angular velocity detector is disclosed in JP-A-62-52410. This angular velocity detector only drives the driving piezoelectric elements so that the phase difference between the output of the driving piezoelectric elements and the output of the detecting piezoelectric elements can be kept at 90 degrees. This angular velocity detector also synchronously detects the output of detecting piezoelectric elements as the angular velocity $\Omega$ based on the outputs of the driving piezoelectric elements.

However, this angular velocity detector does not apply a y-axis direction exciting force to the vibration piece. Therefore, the output of the detecting piezoelectric elements may generate an output even when the angular velocity $\Omega$ is zero. That is, the offset may remain.

SUMMARY OF THE INVENTION

The present invention is made in light of the foregoing problems, and an object of the present invention is to provide a vibration type angular velocity detector which can positively reduce the offset included in the output of an angular velocity detector.

To achieve this object, the inventors of the present invention examined measures for reducing the offset included in the output of the angular velocity detector. Because the coriolis force F may not be zero when the angular velocity $\Omega$ is zero, an offset is output from the detector though the angular velocity $\Omega$ is zero. According to Equation (1), the vibration speed V in Equation (1) should be reduced so that the coriolis force F is reduced.

The inventors of the present invention applied an exciting force to one of the driving piezoelectric elements so that a y-axis direction driving force acts on the vibration piece in addition to the x-axis direction driving force. Also, they applied another exciting force to another driving piezoelectric element, whose phase is opposite to the exciting force applied to one piezoelectric element. In this case, a vibration whose phase is the same as the offset (or opposite to the offset) occurs on the vibration pieces in the y-axis direction. As a result, if the amount of the exciting force and the phase of the exciting force are controlled, the phases of the driving vibration of both of the driving piezoelectric elements are 180 degrees different, and the amplitude of the driving vibration decreases. Therefore, the offset included in the output from the angular velocity is reduced.

The vibration type angular velocity detector includes a control mechanism having an exciting force generator means for generating a y-axis direction exciting force based on a reference output from a reference piezoelectric element so that a phase of an x-axis direction vibration of the movable body is shifted. The control mechanism applies the y-axis direction exciting force to the movable body by driving a driving piezoelectric element. As a result, an offset included in an output of a detecting piezoelectric element is reduced by the y-axis direction exciting force. Therefore, the output from the synchronous detector is precise and without an offset.

BRIEF DESCRIPTION OF THE DRAWINGS

Other features and advantages of the present invention will be appreciated, as well as the method of operation and the functions of related parts, from a study of the following detailed description, the appended claims, and the drawings, all of which form a part of this application. In the drawings:

FIG. 2 is an electric circuit diagram of the angular velocity detector shown in FIG. 1;

FIG. 6 is an electric circuit diagram of the angular velocity detector of a third embodiment of the present invention;

DETAILED DESCRIPTION OF THE PREFERRED EMBODIMENTS

Preferred embodiments of the present invention are now described in detail with reference to drawings.

Figure 1:
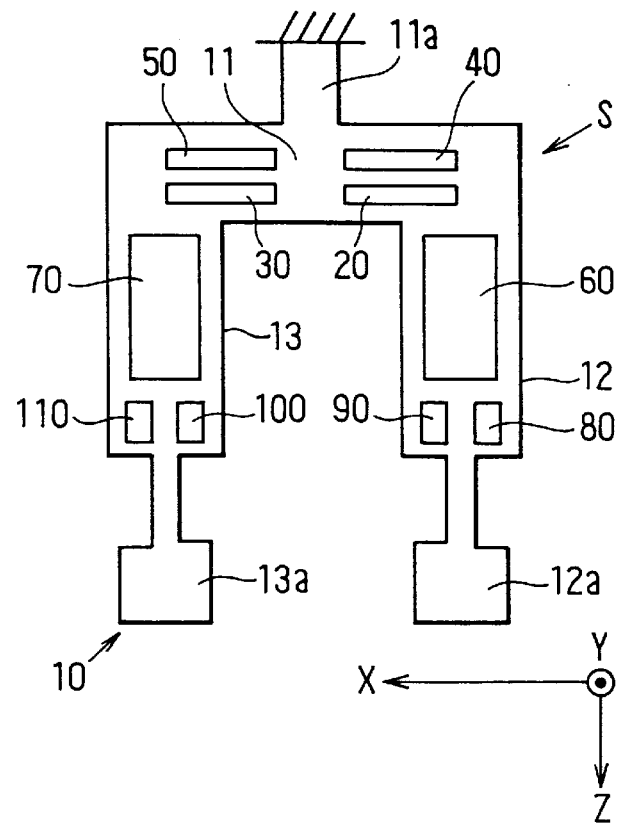
FIG. 1 is a plan view of a vibrator of a vibration type angular velocity detector of a first embodiment of the present invention.

FIGS. 1 and 2 show a vibration type angular velocity detector used for vehicles. As shown in FIG. 1, the vibration type angular velocity detector has a vibrator S which includes a tuning fork movable body 10. The movable body 10 is fixed to a vehicle body by a fixing portion 11a extending from a base 11 in the z-axis direction. The thick direction of the movable body 10 corresponds to the y-axis direction. The longitudinal direction of the base 11 (x-axis direction) corresponds to the lateral direction of the vehicle. Vibration pieces 12 and 13 of the movable body 10 are parallel to each other and extend backward of the vehicle (z-axis direction) from the edges of the base 11. The z-axis corresponds to the axis of the movable body 10 (axis of the fixing portion 11a).

The vibrator S has one pair of driving piezoelectric elements 20 and 30, another pair of driving piezoelectric elements 40 and 50, a pair of detecting piezoelectric elements 60 and 70, one pair of reference piezoelectric elements 80 and 90 and another pair of reference piezoelectric elements 100 and 110. As shown in FIG. 1, the pair of the driving piezoelectric elements 20 and 30 are affixed coaxially and longitudinally on a surface of the base 11, and are symmetric with respect to the z-axis. The pair of the driving piezoelectric elements 40 and 50 are affixed coaxially and longitudinally on the upper portion of the base 11, and are symmetric with respect to the z axis and parallel to the driving piezoelectric elements 20 and 30. The phase difference between driving signals applied to the driving piezoelectric elements 20 and 30 and the driving signals applied to the driving piezoelectric elements 40 and 50 is 180 degrees. When the base 11 shrinks (stretches) longitudinally as a result of the driving signals applied to the driving piezoelectric elements 20 and 30, the base 11 stretches (shrinks) longitudinally as a result of the driving signals applied to the driving piezoelectric elements 40 and 50. According to the vibration of the driving piezoelectric elements 20, 30, 40 and 50, the vibration pieces 12 and 13 vibrate in the x-axis direction in an x-z plane. These vibrations are controlled to resonate the vibration pieces.

The vibration piece 12 has one counter mass portion 12a, and the vibration piece 13 has another counter mass portion 13a. The detecting piezoelectric element 60 is affixed on the surface of the vibration piece 12, and the detecting piezoelectric element 70 is affixed on the surface of the vibration piece 13. When the vehicle rolls from side to side with the movable body 10 vibrating in the x-axis direction, coriolis force occurs and acts on the vibration pieces 12 and 13. The vibration pieces 12 and 13 vibrate in opposite directions along the y-axis. The detecting piezoelectric elements 60 and 70 detect the y-axis vibrations of the vibration pieces 12 and 13, i.e., the detecting piezoelectric elements 60 and 70 detect the vibrations caused by the coriolis force.

The reference piezoelectric elements 80 and 90 are affixed on the surface of the vibration piece 12, and the reference piezoelectric elements 100 and 110 are affixed on the surface of the vibration piece 13. The reference piezoelectric elements 80 and 90 output reference voltages in response to the x-axis vibration of the vibration piece 12, and the reference piezoelectric elements 100 and 110 output reference voltages in responsive to the x-axis vibration of the vibration piece 13. The phases of the reference voltages from the reference piezoelectric elements 80 and 90 are opposite to the phases of the reference voltages from the reference piezoelectric elements 100 and 110.

As shown in FIG. 2, the vibration type angular velocity detector has a difference amplifier 120 whose non-inverting input terminal is connected with the reference piezoelectric elements 80 and 110 and whose inverting input terminal is connected with the reference piezoelectric elements 90 and 100. The difference amplifier 120 amplifies a difference between the sum of the reference voltages from the reference piezoelectric elements 80 and 110 and the sum of the reference voltages from the reference piezoelectric elements 90 and 100, then outputs a first differential amplified voltage.

A first phase controller 130 shifts the phase of the first differential amplified voltage −90 degrees to adjust it to the phase of the coriolis force (phase of the y-axis direction), and outputs a first phase shift voltage. A second phase controller 140 shifts the phase of the first differential amplified voltage to compensate for phase errors of the first differential amplified voltage, and outputs a second phase shift voltage. A third phase controller 150 shifts the phase of the first differential amplified voltage −90 degrees, and outputs a third phase shift voltage. A high gain differential amplifier 160 amplifies a difference between the detection voltage of the detecting piezoelectric element 60 and that of the detecting piezoelectric element 70, and outputs a second differential amplified voltage. A synchronous detector 170 synchronously detects the second differential amplified voltage based on the first phase shift voltage, and outputs a vehicle angular velocity corresponding to the angular velocity of the movable body 10 as a yaw ratio output. An amplifier 180 amplifies the second phase shift voltage and outputs an amplified voltage. An adder 190 adds the third phase shift voltage to the amplified voltage, and applies a first added voltage to the driving piezoelectric elements 20 and 30. An adder 200 adds the third phase shift voltage to the amplified voltage, and outputs a second added voltage. An inverter 210 inverts the phase of the second added voltage, and applies an inversion voltage to the driving piezoelectric elements 40 and 50.

Figure 3A:
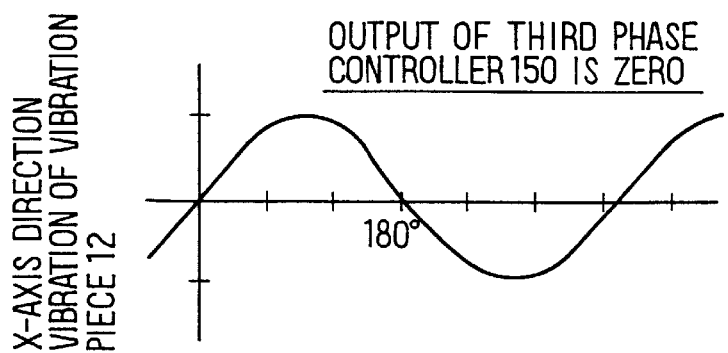
FIG. 3A is a waveform showing the vibration of vibration piece 12a with zero output from a third phase controller 150.
Figure 3B:
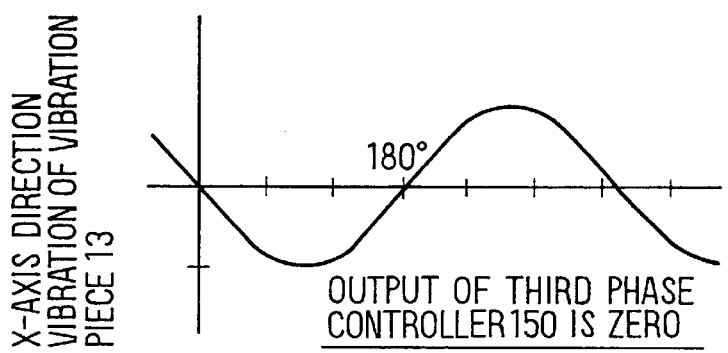
FIG. 3B is a waveform showing the vibration of vibration piece 12a with zero output from the third phase controller 150.
Figure 3C:
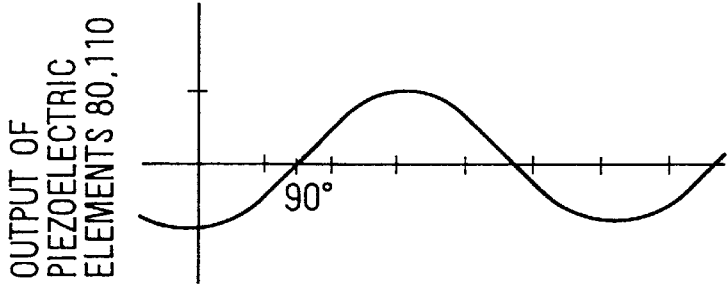
FIG. 3C is a waveform showing output of reference is piezoelectric elements 80 and 110 shown in FIG. 2.
Figure 3D:
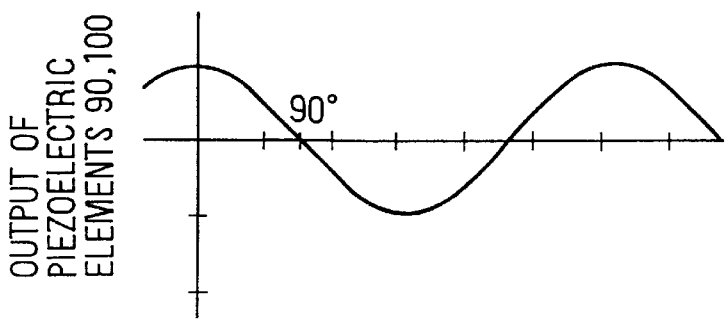
FIG. 3D is a waveform showing the output of reference piezoelectric elements 90 and 100 shown in FIG. 2.

The operation of the above-described angular velocity detector is as follows. The vibration pieces 12 and 13 resonate in the x-axis direction because the base 11 is vibrated by the driving piezoelectric elements 20–50. In this situation, as shown in FIG. 3C, the waveform of the driving voltage applied to the base 11 from the driving piezoelectric elements 20 and 30 is a sine wave. As shown in FIG. 3D, the waveform of the driving voltage applied to the base 11 from the driving piezoelectric elements 40 and 50 is also a sine wave, but whose phase is 180 degrees different from that of the waveform shown in FIG. 3C. As a result, the vibration pieces 12 and 13 vibrate so that the phase difference between the vibration of the vibration piece 12 and the vibration of the vibration piece 13 is 180 degrees. FIG. 3A shows the output of the first adder 190 where the output of the third phase controller 150 (the third phase shift voltage) is zero. FIG. 3B shows the output of the inverter 210 where the output of the third phase controller 150 (the third phase shift voltage) is zero. Further, the reference piezoelectric elements 80 and 90 detect vibrations in the x-axis direction vibration of the vibration piece 12, and the reference piezoelectric elements 80 and 90 detect vibrations in the x-axis direction vibration of the vibration piece 13.

Figure 4A:
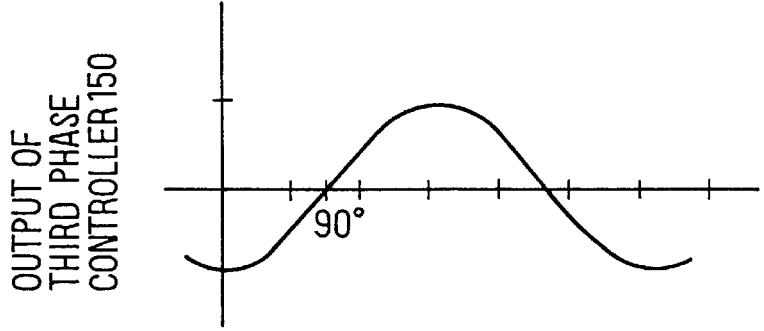
FIG. 4A is a waveform showing the output of a phase controller 150.
Figure 4B:
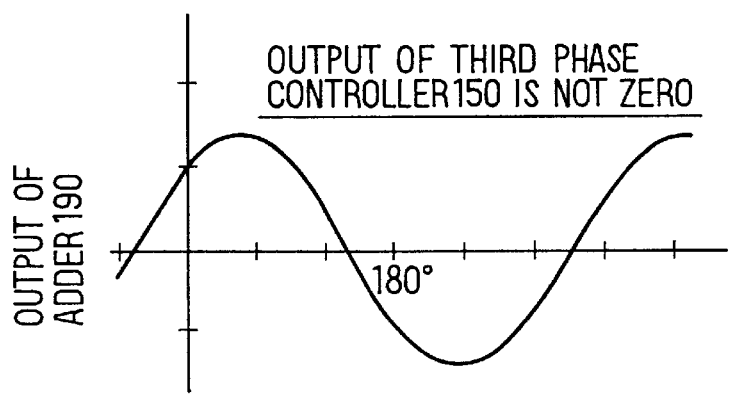
FIG. 4B is a waveform showing the output of the adder 190 where the output of the third phase controller 150 (the third phase shift voltage) is not zero.
Figure 4C:
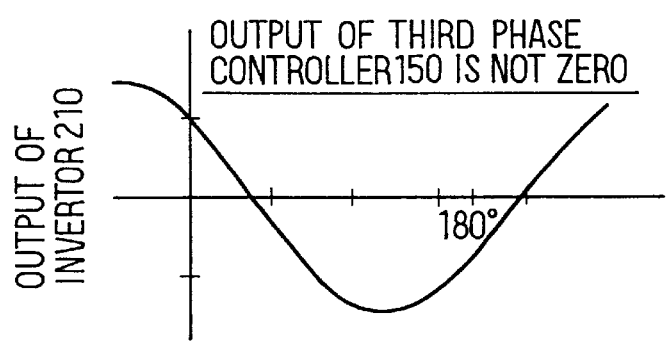
FIG. 4C is a waveform showing the output of the inverter 210 where the output of the third phase controller 150 (the third phase shift voltage) is not zero.

When an angular velocity Ω causes a coriolis force F, the vibration pieces 12 and 13 vibrate in the y-axis direction. In this situation, the difference amplifier 120 amplifies a difference between the sum of the reference voltages outputted from the reference piezoelectric elements 80 and 110 and the sum of the reference voltages outputted from the reference piezoelectric elements 90 and 100, then outputs the first differential amplified voltage. The first differential amplified voltage is shifted by the phase controllers 130–150. A waveform of the third shifted voltage from the third phase controller 150 is shown in FIG. 4A. The detecting piezoelectric elements 60 and 70 detect the y-axis direction vibration of the vibration pieces 12 and 13 caused by the coriolis force F. The high gain differential amplifier 160 amplifies a difference between the detection voltage of the detecting piezoelectric element 60 and that of the detecting piezoelectric element 70, and outputs the second differential amplified voltage. The synchronous detector 170 synchronously detects the second differential amplified voltage based on the first phase shift voltage, and outputs the vehicle angular velocity Ω corresponding to the angular velocity of the movable body 10 as the yaw ratio output. The amplifier 180 amplifies the second phase shift voltage, and outputs the amplified voltage. The adder 190 adds the third phase shift voltage to the amplified voltage, and applies the first added voltage (shown in FIG. 4B) to the driving piezoelectric elements 20 and 30. The adder 200 adds the third phase shift voltage to the amplified voltage, and outputs the second added voltage. An inverter 210 inverts the phase of the second added voltage, and applies the inversion voltage (shown in FIG. 4C) to the driving piezoelectric elements 40 and 50.

Figure 4D:
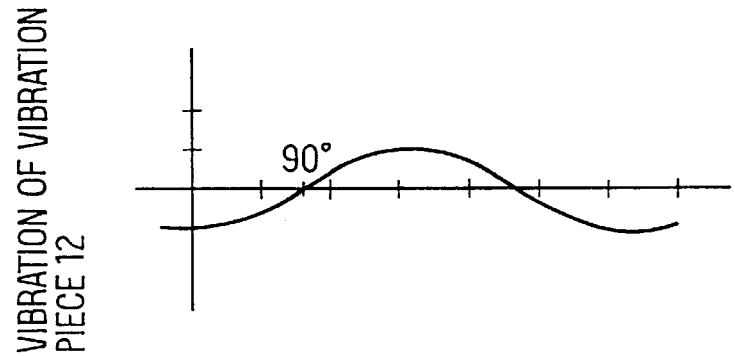
FIG. 4D is a waveform showing the vibration of vibration piece 12 according to the present invention.

With regard to the phase shifts, the first phase controller 130 shifts the phase of the first differential amplified voltage −90 degrees to adjust it to the phase of the coriolis force. The second phase controller 140 shifts the phase of the first differential amplified voltage to compensate for phase errors of the first differential amplified voltage. Thus, not only the second phase shift voltage from the second phase controller 140 but also the amplified voltage from the amplifier 180 is compensated. The third phase controller 150 shifts the phase of the first differential amplified voltage −90 degrees. According to the phase shifts by the phase controllers 130–150, the phase of the first added voltage from adder 190 is the same as that of the second added voltage from adder 200, and the phase inversion voltage from the inverter 210 has a phase difference to the first added voltage. With regard to the vibration direction of the vibration pieces 12 and 13, the y-axis direction vibration is added to the x-axis direction vibration because adders 190 and 200 add the amplified voltage from the amplifier 180 to the third phase shift voltage whose phase is about 90 degrees different from that of the amplified voltage. That is, the added voltages from adders 190 and 200 cause the y-axis direction vibration (y-axis direction exciting force) in addition to the x-axis direction vibration based on the second and third phase voltages. However, the vibration pieces 12 and 13 vibrate in the opposite directions to each other as a result of the inversion voltage. The waveforms of the vibrations applied to the vibration piece 12 is shown in FIG. 4D. The phase of the waveform shown in FIG. 4D is different from that of the x-axis direction vibration of the vibration piece 12 shown in FIG. 3A. The amplitude of the waveform shown in FIG. 4D is smaller than that of the x-axis direction vibration of the vibration piece 12. This means that the x-axis direction vibration of the vibration piece 12 is reduced and the vibration of the vibration piece 12 is induced in the y-axis direction (y-axis direction exciting force). As a result, the amplitude of the vibration speed V of the vibration piece 12, shown in Equation (1), decreases. Thus, the coriolis force F of the vibration piece 12 also decreases, and the offset is reduced.

On the other hand, the phase of the vibration of the vibration piece 13 is opposite to the phase of the waveform shown in FIG. 4D. Further, the phase of this vibration is different from that of the X-axis direction vibration of the vibration piece 13 shown in FIG. 3B. The amplitude of the vibration is smaller than that of the x-axis direction vibration of the vibration piece 13. This means that the x-axis direction vibration of the vibration piece 13 is reduced and the vibration of the vibration piece 13 is induced opposite to the vibration piece 12 and in the y-axis direction (y-axis direction exciting force). As a result, the amplitude of the vibration speed V of the vibration piece 13, shown in Equation (1), decreases. Thus, the coriolis force F of the vibration piece 13 also decreases, and the offset is reduced.

According to this embodiment, the offset included in the outputs of the detecting piezoelectric elements 60 and 70 is reduced by the y-axis direction exciting forces applied to the movable piece 12 through the driving piezoelectric elements 40 and 50 and the y-axis direction exciting forces applied to the movable piece 13 through the driving piezoelectric elements 20 and 30. Therefore, the output from the synchronous detector 170 is precise without the offset.

Second Embodiment

Figure 5:
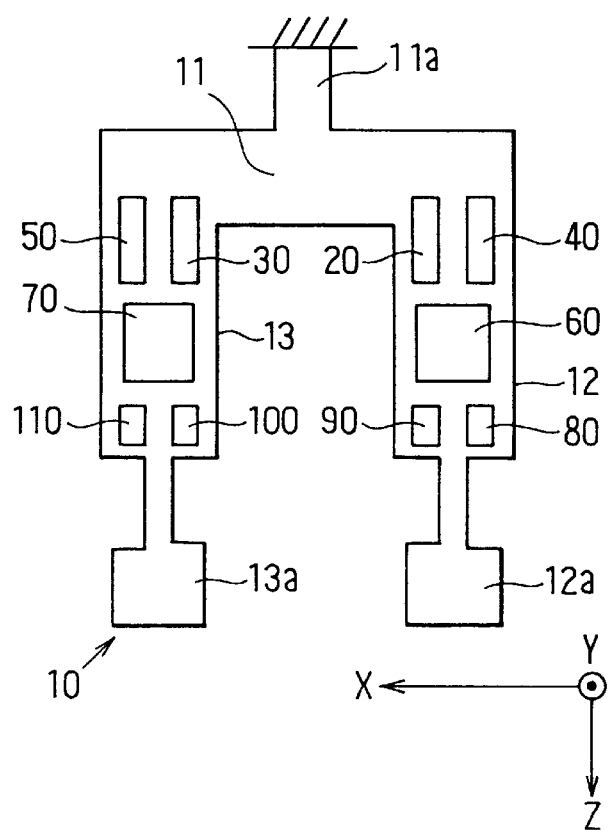
FIG. 5 is a plan view of the movable body of a second embodiment of the present invention.

FIG. 5 shows a movable body 10 of an angular velocity detector of a second embodiment. With the movable body 10 of this embodiment, the driving piezoelectric elements 20 and 40 range from the vibration element 12 to the base 11 along the longitudinal direction of the vibration element 12. The driving piezoelectric elements 20 and 40 are parallel to each other and coaxial to the reference piezoelectric elements 80 and 90. Also, the driving piezoelectric elements 30 and 50 range from the vibration element 13 to the base 11 along the longitudinal direction of the vibration element 13. The driving piezoelectric elements 30 and 50 are parallel to each other and coaxial to the reference piezoelectric elements 100 and 110.

According to the above-described structure, when the adder 190 applies the first added voltage to the driving piezoelectric elements 20 and 30, and the inverter 210 applies the phase inversion voltage to the driving piezoelectric elements 40 and 50, the angular velocity detector can obtain the same effect as the first embodiment.

Third Embodiment

FIG. 6 is an electric circuit diagram of the angular velocity detector of a third embodiment. The angular velocity detector shown in FIG. 6 has a third high gain differential amplifier 120a and a fourth differential amplifier 120b instead of the differential amplifier 120 shown in FIG. 2, and also has a fourth phase controller 130a instead of the first phase controller 130. The angular velocity detector shown in FIG. 6 is the same as that of the first embodiment except for the third high gain differential amplifier 120a, the fourth differential amplifier 120b and the fourth phase controller 130a.

The third high gain difference amplifier 120a amplifies the differential between the reference voltages from the reference piezoelectric elements 80 and 90, then outputs a third difference amplified voltage. The difference amplifier 120b amplifies the difference between the reference voltages from the reference piezoelectric elements 100 and 110, then outputs a fourth differential amplified voltage. The fourth phase controller 130a shifts the phase of the third differential amplified voltage −90 degrees to adjust it to the phase of the coriolis force, and outputs a fourth phase shift voltage. The second phase controller 140 shifts the phase of the fourth differential amplified voltage to compensate for phase errors of the first differential amplified voltage, and outputs the second phase shift voltage. The third phase controller 150 shifts the phase of the fourth differential amplified voltage −90 degrees, and outputs the third phase shift voltage. The synchronous detector 170 synchronously detects the second differential amplified voltage based on the fourth phase shift voltage, and outputs the vehicle angular velocity corresponding to the angular velocity of the movable body 10 as a roll ratio output.

According to this embodiment, the phase of the first phase shift voltage from the fourth phase controller 130a is the same as the phase of the detection voltage of the detecting piezoelectric elements 60 and 70. Therefore, the angular velocity outputted from the synchronous detector 170 can be kept precise, and the angular velocity detector can obtain the same effect as the first embodiment.

Fourth Embodiment

FIGS. 7–10 shows a fourth embodiment of the angular velocity detector of the present invention. In this embodiment, the angular velocity detector has a vibrator Sa instead of the vibrators shown in FIGS. 1 and 5.

Figure 7:
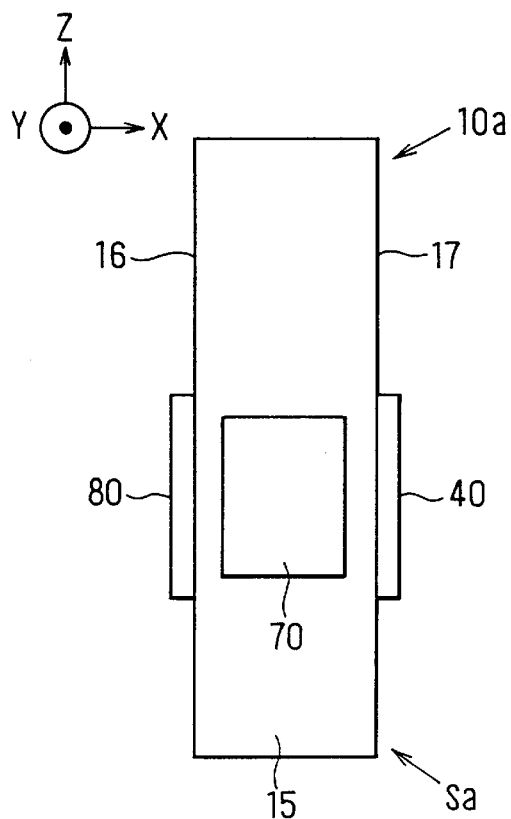
FIG. 7 is a plan view of a vibrator of the vibration type angular velocity detector of a fourth embodiment of the present invention.
Figure 8:
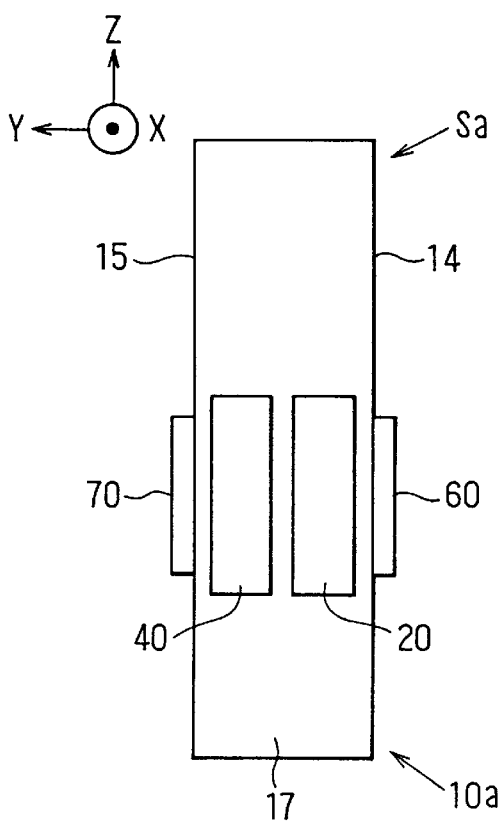
FIG. 8 is a right side view of the vibrator of the fourth embodiment of the present invention.
Figure 9:
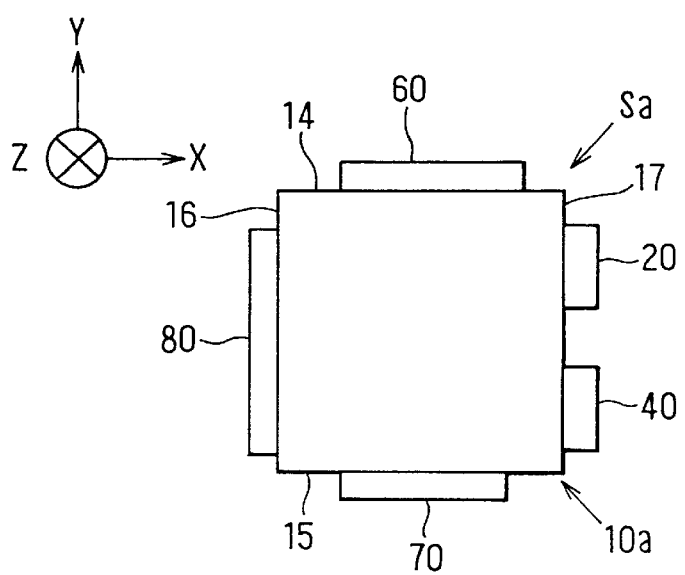
FIG. 9 is a rear view of the vibrator of the fourth embodiment of the present invention.

As shown in FIGS. 7–9, the vibrator Sa has a rectangular prism shaped movable body 10a whose cross section is a square. The movable body 10a is fixed to the vehicle body. The movable body 10a extends backward of the vehicle (z-axis direction) and is parallel to the vehicle body. The Z axis corresponds with the axis of the movable body 10. The vibrator Sa has driving piezoelectric elements 20 and 40, detecting piezoelectric elements 60 and 70 and reference piezoelectric element 80. All are the same as in the first embodiment. The driving piezoelectric elements 20 and 40 are parallel to each other and affixed longitudinally on a right side 17 of the movable body 10a. The driving piezoelectric elements 20 and 40 vibrate the movable body 10a in the x-axis direction. The detecting piezoelectric elements 60 and 70 are affixed longitudinally on an upper side 14 and a lower side 15 of the movable body 10a, and detect the y-axis direction vibration of the movable body 10a corresponding to the coriolis force. The reference piezoelectric element 80 is affixed longitudinally on a left side 16 of the movable body 10a and outputs the reference voltage in responsive to the x-axis direction vibration of the movable body 10a.

Figure 10:
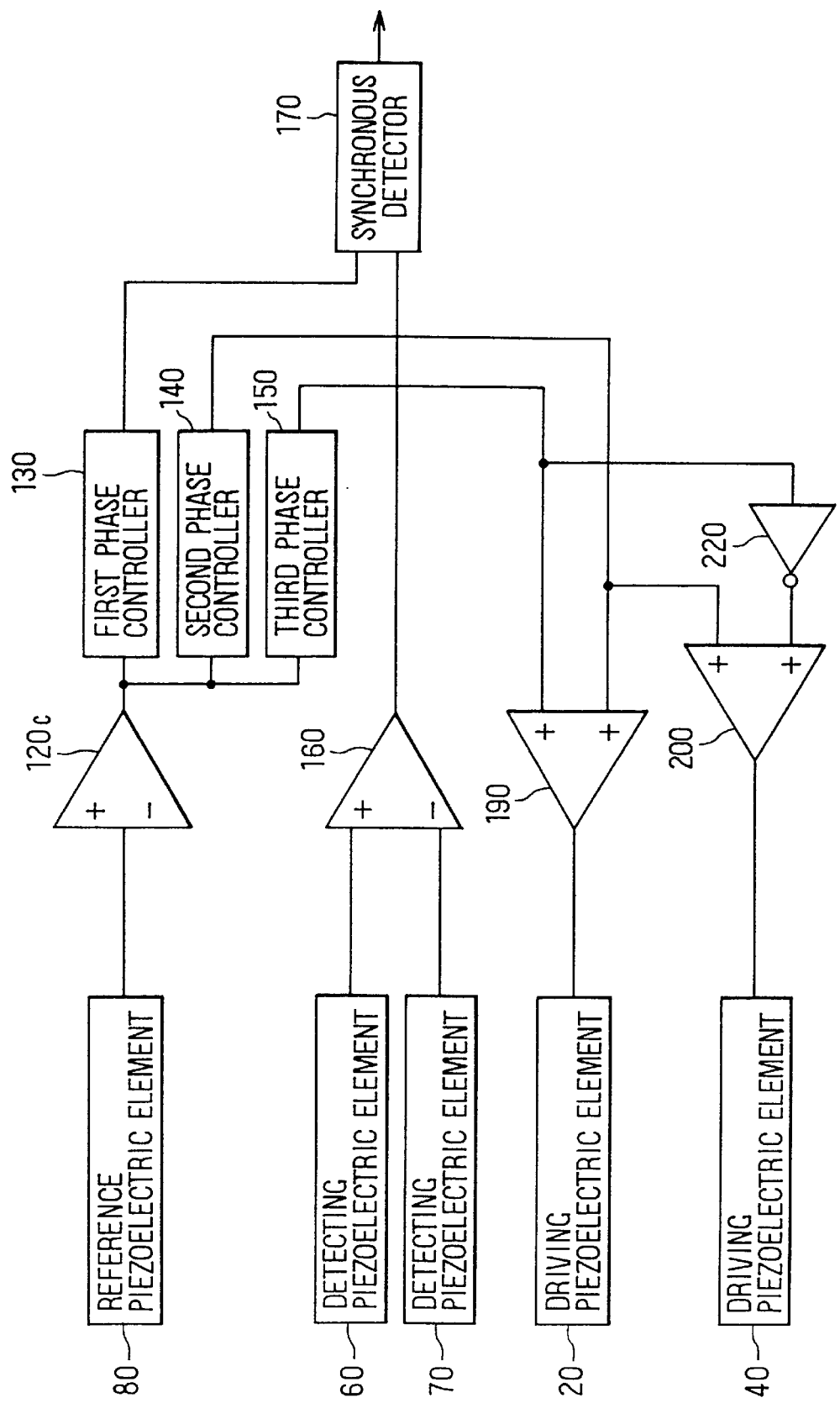
FIG. 10 is an electric circuit diagram of the angular velocity detector of the fourth embodiment of the present invention.

As shown in FIG. 10, the angular velocity detector of this embodiment has an amplifier 120c instead of the difference amplifier 120. The amplifier 120c amplifies the reference voltage from the reference piezoelectric element 80, and outputs the fifth differential amplified voltage to the first to third phase controllers 130–150. The first phase controller 130 shifts the phase of the fifth differential amplified voltage −90 degrees to adjust it to the phase of the coriolis force, and outputs the first phase shift voltage. The second phase controller 140 shifts the phase of the fifth differential amplified voltage to compensate for phase errors of the first differential amplified voltage, and outputs the second phase shift voltage. The third phase controller 150 shifts the phase of the fifth differential amplified voltage −90 degrees, and outputs the third phase shift voltage. The adder 190 adds the second phase shift voltage to the third phase shift voltage, and applies the first added voltage to the driving piezoelectric element 20. An inverter 220 inverts phase of the third phase shift voltage, and applies the inversion voltage to the adder 200. The adder 200 adds the second phase shift voltage to the inversion voltage, and outputs the second added voltage to the driving piezoelectric element 40.

The operation of the above-described angular velocity detector is as follows. The movable body 10a resonates in the x-axis direction by the driving piezoelectric elements 20 and 40. In this situation, the waveforms of the driving voltage applied to the right side 17 of the movable body 10a from the driving piezoelectric elements 20 and 40 are sine waves, but the phase of the driving voltage from the driving piezoelectric element 20 is opposite to that of the driving voltage from the driving piezoelectric element 40. Further, the reference piezoelectric element 80 detects to the x-axis direction vibration of the movable body 10a.

When an angular velocity Ω generates a coriolis force F, the movable body 10a vibrates in the y-axis direction. In this situation, the amplifier 120c amplifies the reference voltages from the reference piezoelectric element 80, then outputs the fifth differential amplified voltage. The fifth differential amplified voltage is shifted by the phase controllers 130–150. The detecting piezoelectric elements 60 and 70 detect the y-axis direction vibration of the movable body 10a caused by the coriolis force F. The high gain differential amplifier 160 amplifies the difference between the detection voltages of the detecting piezoelectric element 60 and the detecting piezoelectric element 70, and outputs the second differential amplified voltage. The synchronous detector 170 synchronously detects the second differential amplified voltage based on the first phase shift voltage, and outputs the vehicle angular velocity Ω corresponding to the angular velocity of the movable body 10a as the yaw ratio output. The adder 190 adds the second phase shift voltage to the third phase shift voltage, and applies the first added voltage to the driving piezoelectric element 20. The inverter 220 inverts the third phase shift voltage, and applies the inversion voltage to the adder 200. The adder 200 adds the second phase shift voltage to the inversion voltage, and outputs the second added voltage to the driving piezoelectric element 40.

According to this embodiment, the offsets included in the outputs of the detecting piezoelectric elements 60 and 70 is reduced by the y-axis direction exciting forces applied to the movable body 10a through the driving piezoelectric elements 20 and 40, whose phases are opposite to each other. Therefore, the output from the synchronous detector 170 is precise without the offset.

The present invention may be embodied in other specific forms without departing from the spirit or essential characteristic thereof. For example, in the first and second embodiment, one of the driving piezoelectric elements 20 and 30 can be omitted. One of the driving piezoelectric elements 40 and 50 can be omitted. One of the detecting piezoelectric elements 60 and 70 can be omitted. One of the reference piezoelectric elements 80 and 90 can be omitted One of the reference piezoelectric elements 100 and 110 can be omitted.

The present invention can be adapted to any type of conveyance, that is, the present invention can be adapted to not only vehicles but also ships or aircraft for example.

We claim:

1. A vibration type angular velocity detector comprising:
   a movable body comprising an axis in a direction corresponding to a z-axis, in a rectangular coordinate system established by an x-axis, a y-axis, and the z-axis;
   driving piezoelectric elements affixed to said movable body for vibrating said movable body in a direction of the x-axis;
   at least one reference piezoelectric element affixed to said movable body for detecting a vibration of said movable body in the x-axis direction and outputting a reference output in response to the vibration of said movable body in the x-direction;
   at least one detecting piezoelectric element affixed to said movable body for detecting the vibration of said movable body in the y-axis direction in response to an angular velocity acting on said movable body where said movable body is vibrating in the x-axis direction;
   a control mechanism for driving said driving piezoelectric elements to have opposite phases so that said movable body vibrates in the x-axis direction based on said reference output from said at least one reference piezoelectric element, said control mechanism comprising:
      an exciting force generator for generating a y-axis direction exciting force based on said reference output so that a phase of the vibration of said movable body in the x-axis direction is shifted; and
      an angular velocity detector for detecting the angular velocity based on said reference output and an output of said at least one detecting piezoelectric element indicative of the vibration of said movable body in the y-axis direction,
      wherein said control mechanism applies said y-axis direction exciting force to said movable body by driving said driving piezoelectric elements.

2. The vibration type angular velocity detector according to claim 1, said angular velocity detector comprising:
   a first phase controller for shifting the phase of said reference output to be the same as a phase of said detecting element output based on said reference output, and
   a synchronous detector for synchronously detecting said detecting element output based on a first phase shifted output shifted by said first phase controller, and for outputting said angular velocity;
   said control mechanism comprising a second phase controller for shifting the phase of said reference output by 90 degrees;
   said exciting force generator comprising:
      a first exciting force generator for adding a second phase shifted output shifted by said second phase controller to said reference output and for generating a first exciting force; and
      a second exciting force generator for inverting said second phase shifted output, for adding an inverted second phase shifted output to said reference output, and for generating a second exciting force; and
   said control mechanism driving one of said driving piezoelectric elements based on said first exciting force so that said movable body vibrates in the y-axis direction, said control mechanism also driving another of said driving piezoelectric elements based on said second exciting force so that said movable body vibrates in the y-axis direction with a phase opposite to a phase of the driving of said one of said driving piezoelectric elements.

3. The vibration type angular velocity detector according to claim 1, wherein said movable body comprises one vibration piece.

4. The vibration type angular velocity detector according to claim 1, wherein said movable body comprises two vibration pieces.

5. The vibration type angular velocity detector according to claim 4, wherein each of said vibration pieces comprises said at least one reference piezoelectric element.

6. The vibration type angular velocity detector according to claim 4, wherein each of said vibration pieces comprises said at least one detecting piezoelectric element.

7. The vibration type angular velocity detector according to claim 1, said angular velocity detector comprising:
   a first phase controller for shifting the phase of said reference output to be the same as a phase of said detecting element output based on said reference output, and
   a synchronous detector for synchronously detecting said detecting element output based on a first phase shifted output shifted by said first phase controller, and for outputting said angular velocity;
   said control mechanism comprising a second phase controller for shifting the phase of said reference output by 90 degrees;
   said exciting force generator comprising:
      a first exciting force generator for adding a second phase shifted output shifted by said second phase controller to said reference output and for generating a first exciting force; and
      a second exciting force generator for adding said second phase shifted output to said reference output to produce an added output, for inverting said added output, and for generating a second exciting force; and
   said control mechanism driving one of said driving piezoelectric elements based on said first exciting force so that said movable body vibrates in the y-axis direction, said control mechanism also driving another of said driving piezoelectric elements based on said second exciting force so that said movable body vibrates in the y-axis direction with a phase opposite to a phase of said driving of said one of said driving piezoelectric elements.

8. A vibration type angular velocity detector comprising:
a movable body comprising an axis in a direction corresponding to a z-axis, in a rectangular coordinate system established by an x-axis, a y-axis, and the z-axis;
driving piezoelectric elements affixed to said movable body for vibrating said movable body in said x-axis direction;
at least one reference piezoelectric element affixed to said movable body for detecting a vibration of said movable body in the x-axis direction and for outputting a reference output in response to the vibration of said movable body in the x-axis direction;
at least one detecting piezoelectric element affixed to said movable body for detecting the vibration of said movable body in the y-axis direction in response to an angular velocity acting on said movable body where said movable body is vibrating in the x-axis direction;
a control mechanism for driving said driving piezoelectric elements to have opposite phases so that said movable body vibrates in the x-axis direction based on said reference output from said at least one reference piezoelectric element, said control mechanism comprising:
an exciting force generator for generating a y-axis direction exciting force based on said reference output so that an offset included in a detecting element output of said at least one detecting piezoelectric element is reduced; and
an angular velocity detector for detecting the angular velocity based on said reference output and said detecting element output,
wherein said control mechanism applies said y-axis direction exciting force to said movable body by driving said driving piezoelectric elements.

9. The vibration type angular velocity detector according to claim 8, said angular velocity detector comprising:
a first phase controller for shifting the phase of said reference output to be the same as a phase of said detecting element output based on said reference output, and
a synchronous detector for synchronously detecting said detecting element output based on a first phase shifted output shifted by said first phase controller, and for outputting said angular velocity;
said control mechanism comprising a second phase controller for shifting the phase of said reference output to reduce said offset included in said detecting element output;
said exciting force generator comprising:
a first exciting force generator for adding a second phase shifted output shifted by said second phase controller to said reference output and for generating a first exciting force, and
a second exciting force generator for inverting said second phase shifted output, for adding an inverted second phase shifted output to said reference output, and for generating a second exciting force; and
said control mechanism driving one of said driving piezoelectric elements based on said first exciting force so that said movable body vibrates in the y-axis direction, said control mechanism also driving another of said driving piezoelectric elements based on said second exciting force so that said movable body vibrates in the y-axis direction with a phase opposite to a phase of said vibration of said driving of said one of said driving piezoelectric elements.

10. The vibration type angular velocity detector according to claim 8, wherein said movable body comprises one vibration piece.

11. The vibration type angular velocity detector according to claim 8, wherein said movable body comprises two vibration pieces.

12. The vibration type angular velocity detector according to claim 11, wherein each of said vibration pieces comprises said at least one reference piezoelectric element.

13. The vibration type angular velocity detector according to claim 11, wherein each of said vibration pieces comprises said at least one detecting piezoelectric element.

14. The vibration type angular velocity detector according to claim 8, said angular velocity detector comprising:
a first phase controller for shifting the phase of said reference output to be the same as a phase of said detecting element output based on said reference output, and
a synchronous detector for synchronously detecting said detecting element output based on a first phase shifted output shifted by said first phase controller, and for outputting said angular velocity;
said control mechanism comprising a second phase controller for shifting the phase of said reference output to reduce said offset included in said detecting element output;
said exciting force generator comprising:
a first exciting force generator for adding a second phase shifted output shifted by said second phase controller to said reference output and for generating a first exciting force, and
a second exciting force generator for adding said second phase shifted output to said reference output to produce an added output, for inverting said added output, and for generating a second exciting force; and
said control mechanism driving one of said driving piezoelectric elements based on said first exciting force so that said movable body vibrates in the y-axis direction, said control mechanism also driving another of said driving piezoelectric elements based on said second exciting force so that said movable body vibrates in the y-axis direction with a phase opposite to a phase of said driving of said one of said driving piezoelectric elements.

15. A vibration type angular velocity detector comprising:
a movable body comprising an axis in a direction corresponding to a z-axis, in a rectangular coordinate system established by an x-axis, a y-axis, and the z-axis;
driving piezoelectric elements affixed to said movable body for vibrating said movable body in a direction of the x-axis;
at least one reference piezoelectric element affixed to said movable body for detecting a vibration of said movable body in the x-axis direction and outputting a reference output in response to the vibration of said movable body in the x-direction;
at least one detecting piezoelectric element affixed to said movable body for detecting the vibration of said movable body in the y-axis direction in response to an angular velocity acting on said movable body where said movable body is vibrating in the x-axis direction;
control means for driving said driving piezoelectric elements to have opposite phases so that said movable body vibrates in the x-axis direction based on said reference output from said at least one reference piezoelectric element, said control means comprising:

exciting force generating means for generating a y-axis direction exciting force based on said reference output so that a phase of the vibration of said movable body in the x-axis direction is shifted; and angular velocity detecting means for detecting the angular velocity based on said reference output and an output of said at least one detecting piezoelectric element indicative of the vibration of said movable body in the y-axis direction, wherein said control means applies said y-axis direction exciting force to said movable body by driving said driving piezoelectric elements.

16. A vibration type angular velocity detector comprising:

a movable body comprising an axis in a direction corresponding to a z-axis, in a rectangular coordinate system established by an x-axis, a y-axis, and the z-axis;

driving piezoelectric elements affixed to said movable body for vibrating said movable body in said x-axis direction;

at least one reference piezoelectric element affixed to said movable body for detecting a vibration of said movable body in the x-axis direction and for outputting a reference output in response to the vibration of said movable body in the x-axis direction;

at least one detecting piezoelectric element affixed to said movable body for detecting the vibration of said movable body in the y-axis direction in response to an angular velocity acting on said movable body where said movable body is vibrating in the x-axis direction;

control means for driving said driving piezoelectric elements to have opposite phases so that said movable body vibrates in the x-axis direction based on said reference output from said at least one reference piezoelectric element, said control means comprising:

exciting force generating means for generating a y-axis direction exciting force based on said reference output so that an offset included in a detecting element output of said at least one detecting piezoelectric element is reduced; and angular velocity detecting means for detecting the angular velocity based on said reference output and said detecting element output, wherein said control means applies said y-axis direction exciting force to said movable body by driving said driving piezoelectric elements.

* * * * *